United States Patent
De Filippis et al.

(10) Patent No.: US 8,016,574 B2
(45) Date of Patent: Sep. 13, 2011

(54) COOLING FAN FOR A MOTOR VEHICLE

(75) Inventors: Pietro De Filippis, Milan (IT); Harald Redelberger, Kürnach (DE)

(73) Assignee: Brose Fahrzeugteile GmbH & Co. Kommanditgesellschaft Wuerzburg, Wuerzburg (DE)

( * ) Notice: Subject to any disclaimer, the term of this patent is extended or adjusted under 35 U.S.C. 154(b) by 701 days.

(21) Appl. No.: 12/090,190

(22) PCT Filed: Sep. 8, 2006

(86) PCT No.: PCT/EP2006/066170
§ 371 (c)(1),
(2), (4) Date: Aug. 12, 2008

(87) PCT Pub. No.: WO2007/042362
PCT Pub. Date: Apr. 19, 2007

(65) Prior Publication Data
US 2009/0142203 A1    Jun. 4, 2009

(30) Foreign Application Priority Data

Oct. 14, 2005   (DE) .................. 10 2005 049 261

(51) Int. Cl.
*F04B 35/04* (2006.01)
(52) U.S. Cl. .................. 417/423.8; 417/368; 310/59
(58) Field of Classification Search ............. 417/355, 417/356, 366, 368, 423.7, 423.8; 310/58, 310/59, 61
See application file for complete search history.

(56) References Cited

U.S. PATENT DOCUMENTS

| | | | | |
|---|---|---|---|---|
| 3,303,955 | A | | 2/1967 | Boeckel ................. 230/117 |
| 3,303,995 | A | * | 2/1967 | Boeckel ................. 417/353 |
| 4,210,833 | A | * | 7/1980 | Neveux .................. 310/58 |
| 4,210,835 | A | * | 7/1980 | Neveux .................. 310/62 |
| 4,554,472 | A | * | 11/1985 | Kumatani ............... 310/62 |
| 5,236,306 | A | * | 8/1993 | Hozak ................... 416/93 R |
| 5,967,764 | A | * | 10/1999 | Booth et al. ........... 417/423.8 |
| 6,384,494 | B1 | * | 5/2002 | Avidano et al. ........ 310/58 |
| 6,494,681 | B2 | * | 12/2002 | Barry et al. ............ 416/175 |
| 7,244,110 | B2 | * | 7/2007 | Hong et al. ............ 417/368 |
| 7,598,634 | B2 | * | 10/2009 | Izumi ................... 310/58 |
| 2003/0068240 | A1 | * | 4/2003 | Hsieh ................... 417/368 |

(Continued)

FOREIGN PATENT DOCUMENTS

DE   1 488 640   8/1969

(Continued)

OTHER PUBLICATIONS

Written Opinion of the International Searching Authority PCT/EP2006/066170, 2 pages, 2005.

*Primary Examiner* — Devon C Kramer
*Assistant Examiner* — Peter J Bertheaud
(74) *Attorney, Agent, or Firm* — Westman, Champlin & Kelly, P.A.

(57) ABSTRACT

A cooling fan (1) for a motor vehicle has a fan wheel (4) and a brushless fan motor (2) which is used to drive the fan wheel (4). The fan motor (2) has an internal rotor (3). The fan wheel (4) is directly connected to the internal rotor (3) in order to reduce the size of the type of cooling fan (1) whilst retaining the power output.

12 Claims, 7 Drawing Sheets

U.S. PATENT DOCUMENTS

| | | |
|---|---|---|
| 2003/0140643 A1 | 7/2003 | Yoshimura .................... 62/186 |
| 2005/0121170 A1 | 6/2005 | Maeda et al. ................. 165/67 |
| 2005/0265864 A1* | 12/2005 | Hsieh ........................ 417/423.8 |

FOREIGN PATENT DOCUMENTS

| | | |
|---|---|---|
| DE | 42 11 183 A1 | 10/1993 |
| DE | 42 14 160 A1 | 11/1993 |
| DE | 94 04 147 U1 | 4/1994 |
| DE | 199 45 016 A1 | 4/2000 |
| DE | 103 21 732 A1 | 12/2004 |
| DE | 103 42 049 A1 | 5/2005 |
| DE | 10 2004 058 724 A1 | 7/2005 |
| EP | 0 521 285 A1 | 5/1992 |
| EP | 0 569 738 A1 | 4/1993 |
| EP | 0 761 982 A1 | 3/1997 |
| EP | 1 406 377 A1 | 4/2004 |
| EP | 1 495 886 A1 | 1/2005 |
| JP | 10080191 A | 3/1998 |
| JP | 2006-007921 | 1/2006 |

* cited by examiner

COOLING FAN FOR A MOTOR VEHICLE

CROSS-REFERENCE TO RELATED APPLICATIONS

This application is a U.S. national stage application of International Application No. PCT/EP2006/066170 filed Sep. 8, 2006, which designates the United States of America, and claims priority to German application number 10 2005 049 261.4 filed Oct. 14, 2005, the contents of which are hereby incorporated by reference in their entirety.

TECHNICAL FIELD

The invention relates to a cooling fan for a motor vehicle, with a fan wheel and with a brushless fan motor for driving the fan wheel, with the fan motor having an internal rotor.

BACKGROUND

The use of brushless fan motors is known in the automotive industry. These are used for applications such as cooling fans for cooling down the internal combustion engine and for cooling fans for air conditioning and interior ventilation systems.

With known brushless fan motors with internal rotors, both rotor and stator and also the motor electronics are enclosed in a housing between a front and a rear end shield. The fan wheel is arranged outside the housing and is connected to the fan motor via the drive shaft. The drive shaft in this case is guided in the front and in the rear end shield of the housing.

The German utility model 94 04147 U1 discloses an axial fan in which the fan wheel is connected directly to a rotor embodied as an internal rotor of the fan. On the face of the rotor arranged opposite the fan wheel an additional smaller fan wheel is provided for creating an air flow through an air gap formed by stator and rotor, which cools the windings of the rotor and of the stator and avoids deposits of moisture in the air gap of the motor.

German application DE 42 14 160 A1 describes a fan in which the fan wheel carries the rotor of the drive without a drive shaft being used for this purpose.

SUMMARY

The size of the cooling fan can be reduced while retaining the power output. According to an embodiment, a cooling fan for a motor vehicle, may comprise a fan wheel having a fan hub and a brushless fan motor having an internal rotor for driving the fan wheel, wherein the fan hub is connected directly to the internal rotor, and the fan hub has a number of fan blades on its inner side facing towards the internal rotor, the fan blades are arranged in two groups, with the one group serving primarily to create a flow or air through an open central area of the internal rotor while the other serves primarily to create a flow of air through the groove slots of the stator.

According to a further embodiment, the two groups of fan blades may be spaced from each other for accommodating winding ends of the windings of the stator. According to a further embodiment, the one group of fan blades may be arranged close to the guide shaft and the fan blades may be embodied curved against the direction of rotation. According to a further embodiment, the other group of fan blades may be arranged on the outer edge of the hub and is embodied straight. According to a further embodiment, the internal rotor may have a guide opening for accommodating the guide shaft and the guide shaft may be supported in a rear end shield of a housing. According to a further embodiment, the guide shaft may be supported in or on the internal rotor and may be attached in a housing. According to a further embodiment, the guide shaft may be supported in or on the fan hub and may be attached in a housing. According to a further embodiment, two ball races, one ball race and one bearing or two bearings may be used to support the guide shaft.

BRIEF DESCRIPTION OF THE DRAWINGS

The invention will be described below with reference to an exemplary embodiment which is explained in greater detail with the aid of drawings. The drawing shows.

DETAILED DESCRIPTION

Figure 2:
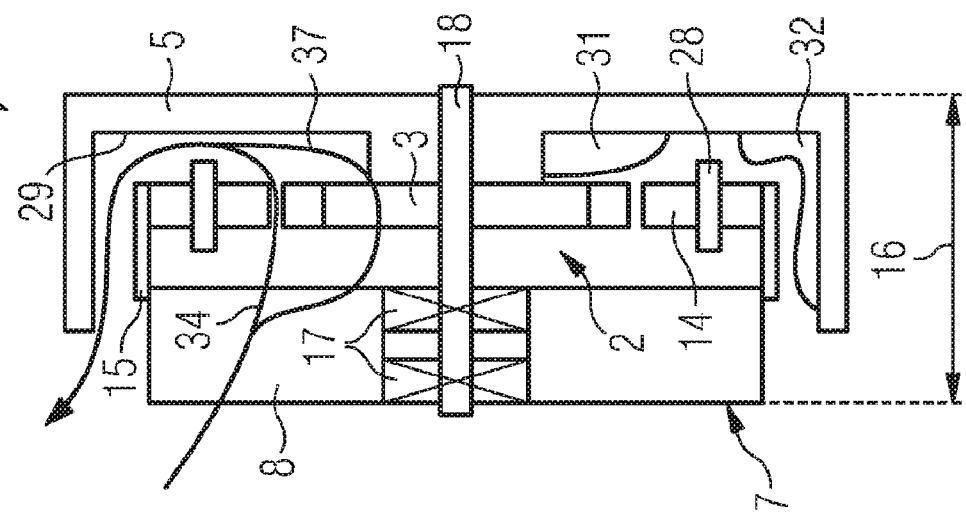

According to various embodiments, a cooling fan for a motor vehicle, may have a fan wheel and a brushless fan motor for driving the fan wheel, with the fan motor having an inner rotor, with the fan wheel having a fan hub and the fan hub being connected directly to the inner rotor and with the fan hub having a number of fan blades on its inner side facing the inner rotor. In accordance with various embodiments, the fan blades may be arranged in two groups, with the one group mainly serving to create a flow or air through an open central area of the inner rotor, while the other group mainly serves to create a flow of air through groove slots of the stator.

This constructive embodiment on the one hand achieves a clear reduction of the axial length. A front end shield is not needed. Since the fan wheel is driven directly via the inner rotor no drive shaft is needed. Despite this a guide shaft can be provided to support the internal rotor.

In addition the weight of the fan motor and thus of the entire cooling fan can be reduced. At the same time a reduction in manufacturing and installation costs may be produced as well as—by the reduction in the number of parts—an increase in the reliability.

According to various embodiments, despite the reduced size of the cooling fan, a greatly improved heat removal from fan motor and motor electronics can be achieved. The reduced length shortens the distances which the cooling air has to cover inside the fan motor. This reduces the fall in pressure, so that the effectiveness of the cooling by the forced heat convection is increased.

Because of the direct connection of the fan wheel via its fan hub to the inner rotor a maximum reduction in the axial length of the cooling fan is possible. This allows an especially compact design to be achieved.

To make a direct connection of the fan wheel possible a housing open in the direction of the fan wheel can be provided. Since no front end shield closes off the housing a direct cooling of the components arranged in the housing (windings etc.) is possible. To this end the fan hub may have a number of fan blades on its inner side facing towards the internal rotor.

The arrangement of the fan blades in two groups means that an especially effective cooling down of the motor electronics in the housing on the one hand and a cooling down of the windings on the other hand and thereby an improved self-cooling of the fan motor can be achieved.

According to various embodiments, cooling fans can be provided for applications in the automotive industry which are improved as regards output, reliability and efficiency compared to the solutions known from the prior art.

If the two groups of fan blades are spaced from one another, so that they are able to accommodate single-tooth windings projecting from the stator, the axial length may be further reduced.

It can be also especially advantageous for the guidance of the two cooling air streams if the one group of fan blades is arranged near to the guide shaft and the fan blades in this case are embodied bent against the direction of rotation, while the other group of fan blades are arranged around the circumference of the hub and are embodied straight.

Further constructively advantageous embodiments may include: An internal rotor with a guide opening for accommodating the guide shaft which is supported in a rear end shield of a housing; A support of the guide shaft in or on the internal rotor in connection with a fixing of the guide shaft in a housing as well as a support of the guide shaft in or on the fan hub in connection with a fixing of the guide shaft in a housing.

For an especially secure support of the guide shaft in this case preferably two ball races, one ball race and a one bearing or two bearings are used.

Figure 1:
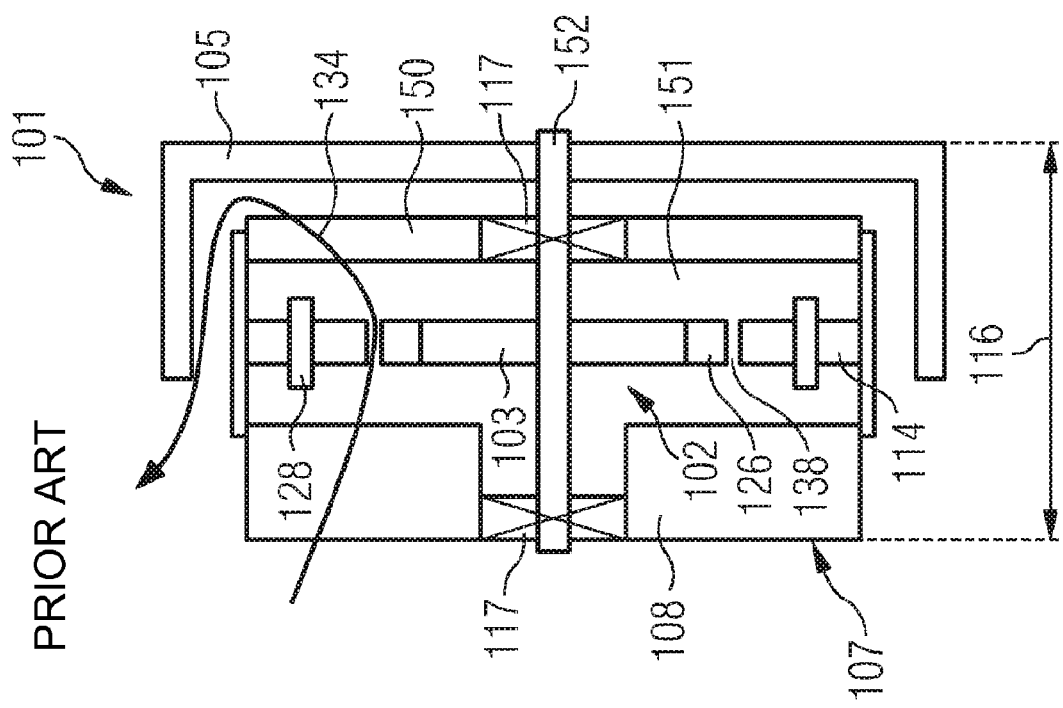
FIG. 1 a schematic cross-sectional view of a conventional cooling fan with a fan motor with internal rotor, FIG. 2 a schematic cross-sectional view of a cooling fan with a fan motor with internal rotor according to an embodiment, FIG. 3 a first exploded view of a cooling fan according to an embodiment (viewed at an angle from the front), FIG. 4 a second exploded view of a cooling fan according to an embodiment (viewed at an angle from the rear), FIG. 5 a view from above of a housing of a cooling fan according to an embodiment, FIG. 6 a cross-sectional view of a cooling fan according to an embodiment along the line AA in FIG. 5, FIG. 7 a cross-sectional view of a stator and of an internal rotor in accordance with an embodiment along the line BB in FIG. 6, and FIG. 8 a view from above of the inside of the fan hub of the fan wheel of the cooling fan according to an embodiment.
Figure 3:
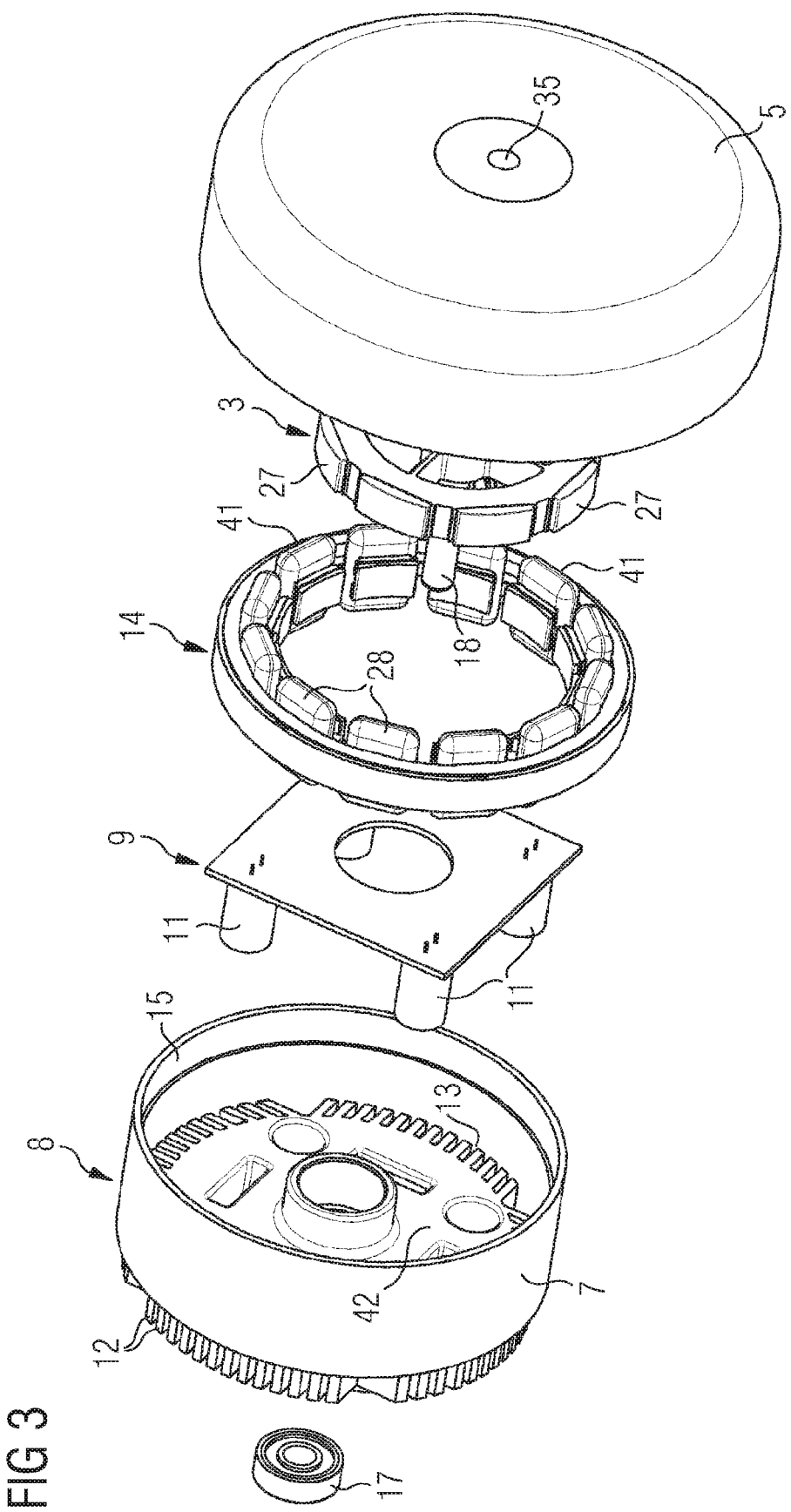
Figure 4:
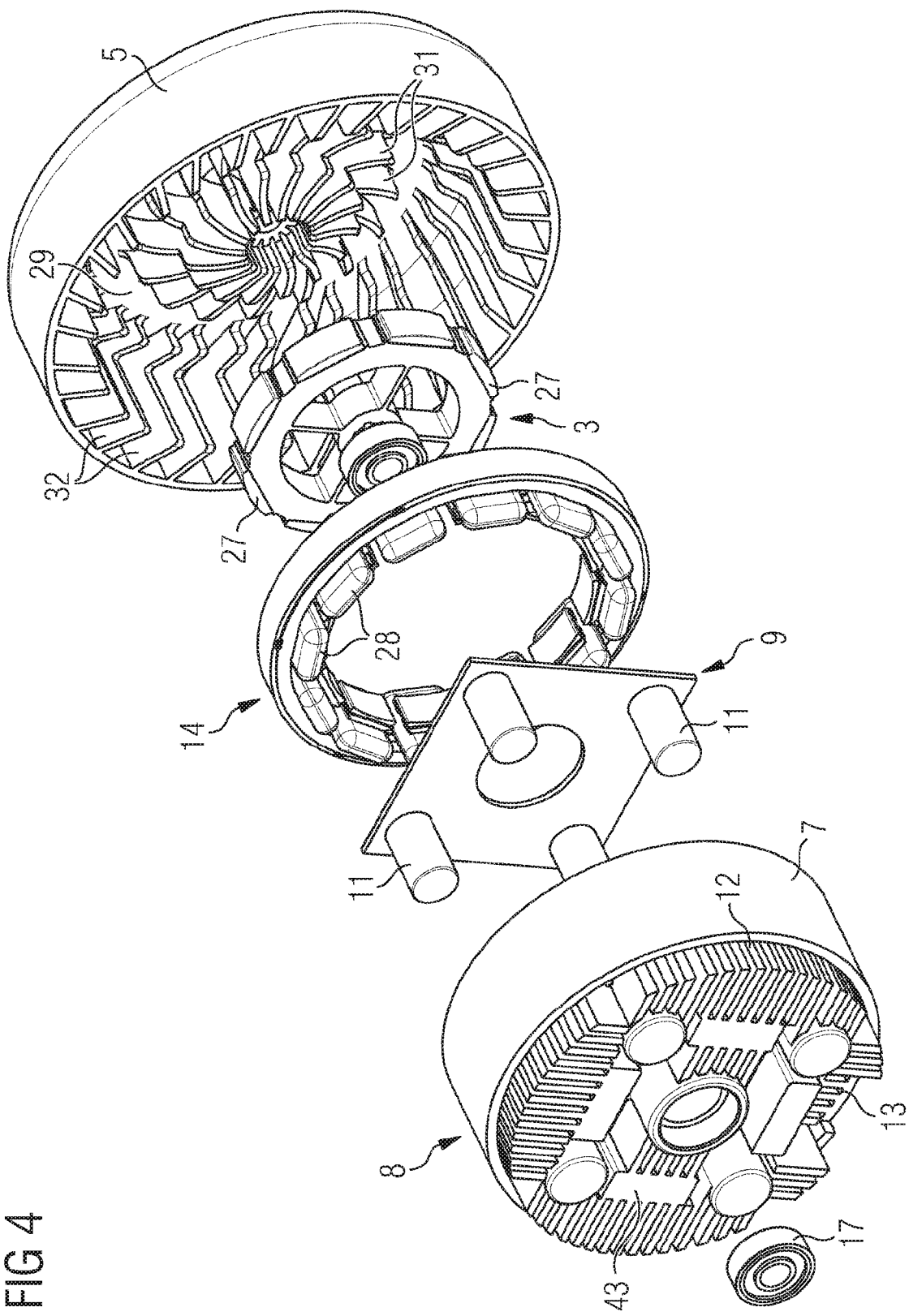
Figure 5:
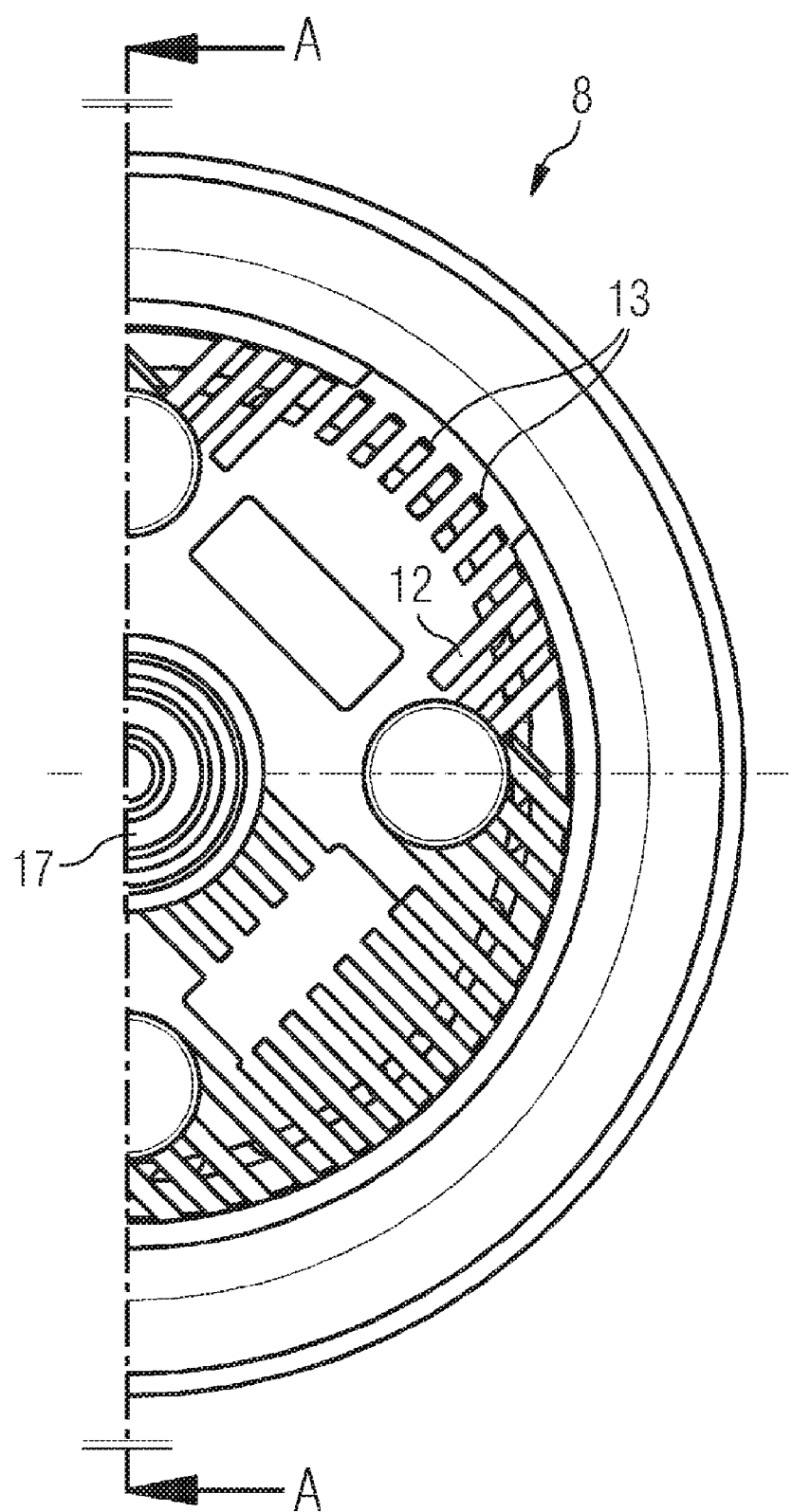
Figure 6:
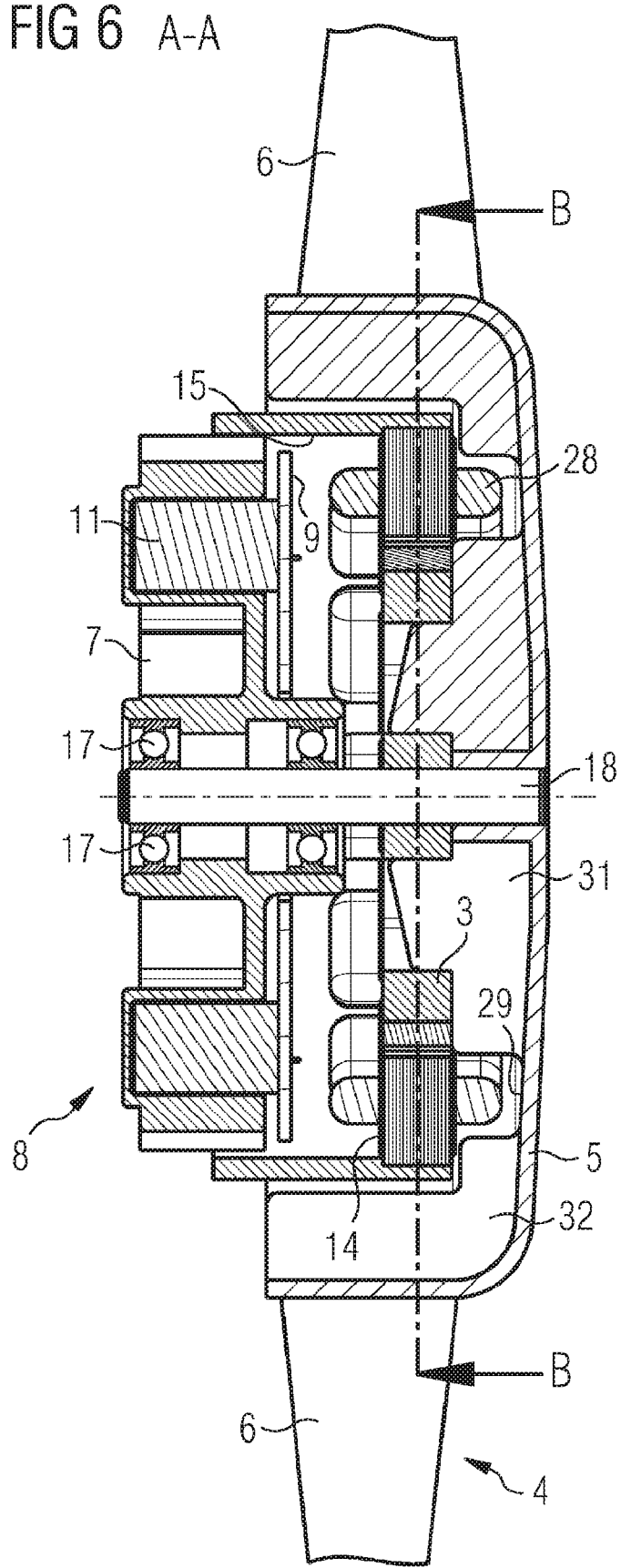
Figure 7:
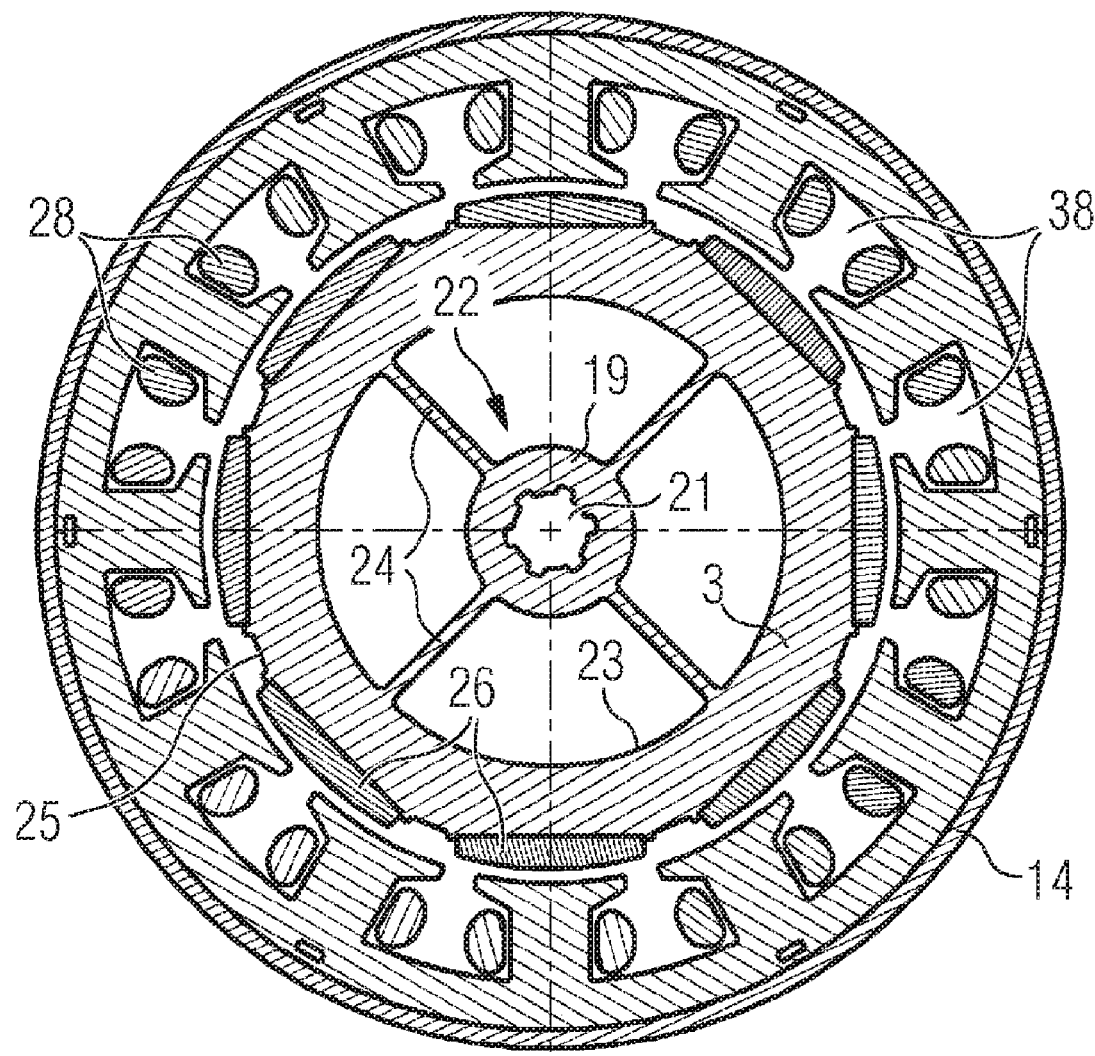
Figure 8:
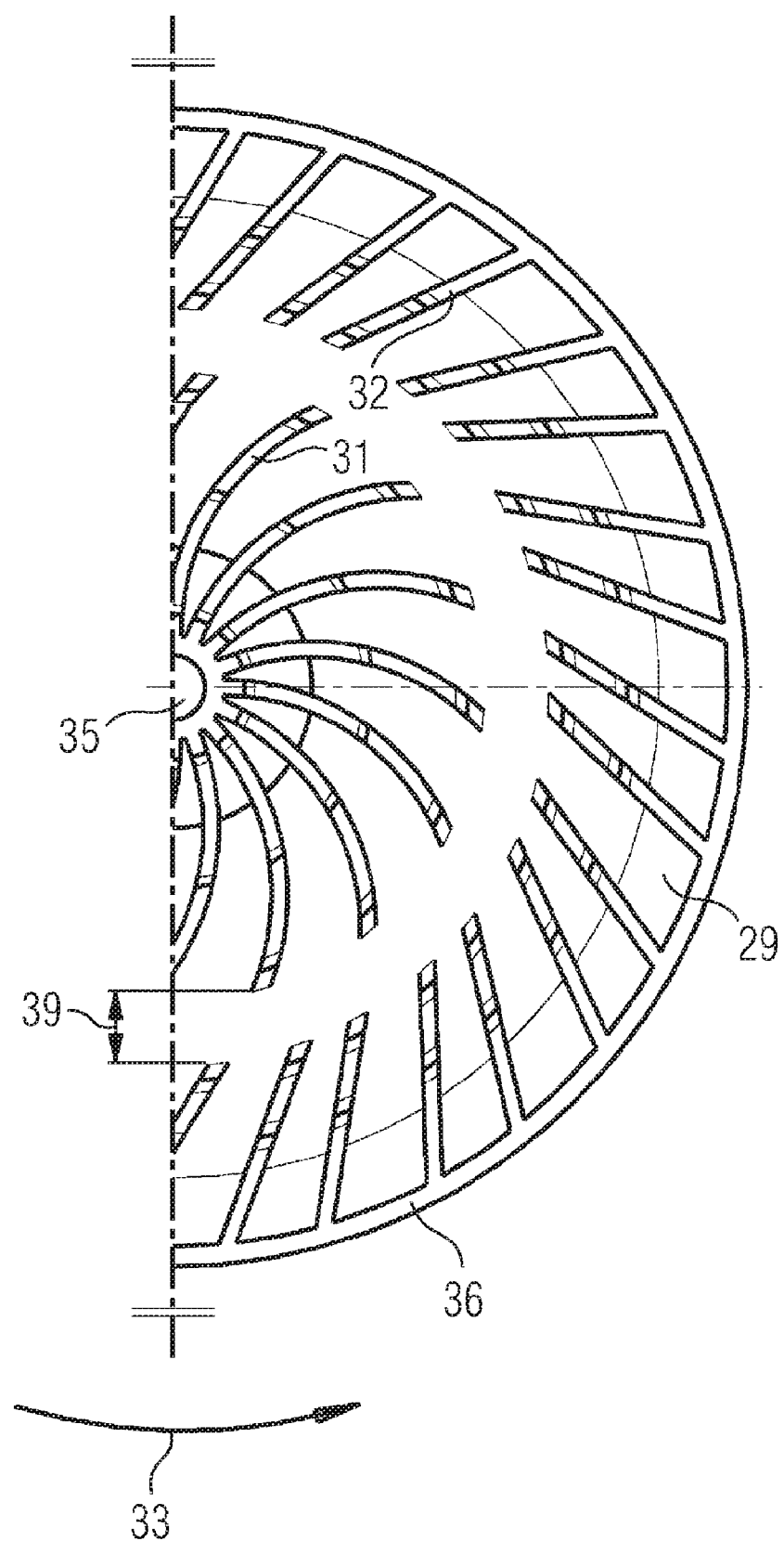

FIG. 1 shows a cooling fan 101 known from the prior art which features a fan motor 102 with an internal rotor 103. The aluminum housing 107, which simultaneously serves as a cooling element, features a front end shield 150 and a rear end shield 108 which form an enclosed inner chamber 151 for accommodating the stator 114 and the internal rotor 103. The motor electronics is arranged in the rear end shield 108. Bearings 117 for supporting a drive shaft 152 are provided both in the front end shield 150 and also in the rear end shield 108. Linked to the drive shaft 152 is the internal rotor 103 with permanent magnets 126. The stator 114 features a copper winding 128. Attached to the drive shaft 152 protruding from the front end shield 150 is the fan hub 105 of the fan wheel. The torque is transmitted from the fan motor 102 to the fan wheel via the drive shaft 152. The cooling air stream 134 runs along the motor electronics, through the groove slots 138 of the stator 114 and through openings in the front end shield 150 into the open. The axial length 116 is determined by the length of the rear end shield 108, stator 114 or internal rotor 103, front end shield 150 and fan hub 105 as well as the associated spaces.

FIG. 2 to 8 show an exemplary embodiment. The cooling fan 1 shown has a fan motor 2 with an internal rotor 3. The fan wheel 4 features a fan hub 5 and a number of fan blades 6 extending radially outwards from the fan hub 5. It can for example be embodied as an axial fan.

The aluminum housing 7 embodied as a cooling element essentially consist of a rear end shield 8, and which is arranged in the motor electronics 9 with components such as electrolytic capacitors 11, MOSFETs, processor etc. The end shield 8 is provided with a plurality of cooling fins 12 and passages 13 for cooling air. These are used for removing heat by heat transfer, heat radiation and heat convection.

A stator 14 is attached to a mounting ring 15 which is embodied as an integral component of the housing 7 (cf. FIG. 7) and extends from the end shield 8 in the direction of the fan wheel 4. The housing 7 is open in the direction of the fan hub 5 of the fan wheel 4. The stator 14 and the internal rotor 3 are thus arranged without a separating housing part immediately adjacent to the fan wheel 4.

The fan hub 5 is connected directly to the internal rotor 3. The torque is thus transmitted directly from the internal rotor 3 to the fan wheel 4. The axial length 16 of the cooling fan 1 is greatly reduced in relation to the solution shown in FIG. 1. At the same time the manufacturing costs are lower than with conventional internal rotor solutions, since neither an attachment of the internal rotor 3 to a drive shaft which is subjected to high loads, nor an attachment of the fan wheel 4 to the drive shaft which is subjected to high loads is required.

The fan hub 5 can be connected to the internal rotor 3 in a different way, for example by screwing, injection, pressing-on by establishing a press fit or such like.

Provided in the rear end shield 8 are two centrally arranged ball races 17 for supporting a guide shaft 18. The guide shaft 18 is not allocated any drive function. The guide shaft 18 is used for guidance of the internal rotor 3 and the fan hub 5. As an alternative to this, another support configuration can also be used, for example by using one ball race and one bearing or by using two bearings. Alternatively the bearing or bearings can also be provided in or on the internal rotor 3, with the guide shaft 18 then being attached in the housing 7. Alternatively the bearing or the bearings can be provided in or on the fan hub 5, with the guide shaft 18 again being attached in the housing 7.

The internal rotor 3 constructed from a number of steel sheets features a central guide element 19 with a guide opening 21 for accommodating the guide shaft 18. The guide element 19 is surrounded by a central area 22 which is embodied to be open and is suitable for the passage of cooling air. The central area 22 is arranged in an area of the internal rotor 3 which has no magnetic effect. Because of the absence of rotor material this produces in some cases a significant weight reduction of the internal rotor 3 while retaining the power output of the fan motor 2.

The central area 22 is surrounded by an outer ring 23 which forms the actual "iron" of the fan motor 2 and is connected to the central guide element 19 via four support and connecting bars 24. On the circumference 25 of the outer ring 23 are arranged a number of permanent magnets 26 in the shape of loaf magnets such that the magnetically non-effective area is produced inside the internal rotor 3. Alternatively pocket magnets can also be used. The permanent magnets are preferably rare earth magnets. These are joined to the outer ring 23 by a plastic injection surround 27. The stator 14 features a number of copper windings 28 in the form of single-teeth windings.

The fan hub 5 protruding in the shape of a bowl around the support ring 15 of the housing 7 has on its inner side 29 facing towards the internal rotor 3 a number of fan blades 31, 32 which are arranged such that they create cooling air streams when the fan wheel 4 is turned in direction of rotation 33.

In this case the fan blades 31, 32 are arranged in two groups. The one group of fan blades 31 is arranged close to the guide shaft 18 and serves primarily for creating a flow of air 34 through the open central area 22 of the internal rotor 3 and thus above all for cooling down the motor electronics 9 arranged in the end shield 8 open in the direction of the fan wheel 4. The individual fan blades 31 form a radial fan in this case. They are embodied curved against the direction of rotation 33 (i.e. "backwards") and extend, starting from the central guide opening 35 of the fan hub 5, in the direction of the outer edge of the fan hub 36.

The other group of fan blades 32 is arranged spaced away from the guide shaft 18, on the outer edge of the fan hub 36 and along bowl-shaped extension of the fan hub 5 and primarily serves to create a flow of air 37 through the groove slots 38 of the stator 14. This cooling air stream is used for direct cooling down of the windings 28 of the stator 14 and also for cooling down the motor electronics 9. The individual fan blades 32 are in this case embodied straight and extend, starting from the outer edge of the hub 36, inwards at an angle in the direction of rotation 33. To allow sufficient cooling the electromagnetic characteristics of the fan motor 2 are matched to each other such that a lower occupancy of the grooves is present such that a sufficient flow of air for cooling can flow through the groove slots 38.

The two groups of fan blades 31, 32 are spaced from each other. The gap 39 is used to accommodate the winding ends 41 of the windings 28 of the stator 14. This further reduces the axial length 16 of the cooling fan 1. An especially high cooling power output is achieved because of the higher air speeds which can then be achieved by the gaps between the windings 28 and the adjoining ends of the fan blades 31, 32 being very small.

A greatly improved cooling of the stator 14 and of the motor electronics 9 is achieved in relation to the known solutions by the two cooling air streams 34, 37 with the aid of heat convection. The cool air lost to the outside is minimized because of the shorter paths. In addition the number of the areas in which turbulence can arise is limited according to various embodiments, so that overall a much more even flow of cooling air is produced. This is made possible by there being no intermediate parts between the fan hub 5 with its fan blades 31, 32 on the one hand and the active motor parts (stator 14 and internal rotor 3) on the other hand.

The entire motor electronics 9 is arranged for simple installation on the front side 42 of the end shield 8 facing towards the fan hub 5. As an alternative the motor electronics 9 can also be arranged for thermal reasons completely or partly on the rear side 43 of the end shield 8 facing away from the fan hub 5.

The invention claimed is:

1. A cooling fan for a motor vehicle, comprising a fan wheel having a fan hub and a brushless fan motor having a stator and an internal rotor for driving the fan wheel, wherein the fan hub is connected directly to the internal rotor, and the fan hub has a number of fan blades on its inner side facing towards the internal rotor, the fan blades are arranged in two groups, with the first group serving primarily to create a flow or air through an open central area of the internal rotor while the second group serves primarily to create a flow of air through groove slots in the stator; wherein the two groups of fan blades are spaced from each other for accommodating winding ends of the windings of the stator; and wherein the first group of fan blades is arranged close to a guide shaft and curved against the direction of rotation.

2. The cooling fan according to claim 1, wherein the second group of fan blades is arranged on the outer edge of the hub and is embodied straight.

3. The cooling fan according to claim 1, wherein the internal rotor has a guide opening for accommodating the guide shaft and the guide shaft is supported in a rear end shield of a housing.

4. The cooling fan according to claim 1, wherein the guide shaft is supported in or on the internal rotor and is attached in a housing.

5. The cooling fan according to claim 1, wherein the guide shaft is supported in or on the fan hub and is attached in a housing.

6. The cooling fan according to claim 1, wherein two ball races, one ball race and one bearing or two bearings are used to support the guide shaft.

7. A method of operating a cooling fan for a motor vehicle, comprising the steps of: providing a fan wheel having a fan hub and a brushless fan motor having a stator and an internal rotor for driving the fan wheel, wherein the fan hub has a number of fan blades; connecting the fan hub directly to the internal rotor; arranging the fan blades in two groups, with the first group serving primarily to create a flow or air through an open central area of the internal rotor while the second group serves primarily to create a flow of air through groove slots in the stator; wherein the two groups of fan blades are spaced from each other for accommodating winding ends of the windings of the stator; and wherein the first group of fan blades is arranged close to a guide shaft and curved against the direction of rotation.

8. The method according to claim 7, wherein the second group of fan blades is arranged on the outer edge of the hub and is embodied straight.

9. The method according to claim 7, wherein the internal rotor has a guide opening for accommodating the guide shaft and the guide shaft is supported in a rear end shield of a housing.

10. The method according to claim 7, wherein the guide shaft is supported in or on the internal rotor and is attached in a housing.

11. The method according to claim 7, wherein the guide shaft is supported in or on the fan hub and is attached in a housing.

12. The method according to claim 7, wherein two ball races, one ball race and one bearing or two bearings are used to support the guide shaft.

* * * * *